United States Patent [19]

Seto

[11] Patent Number: 5,559,413
[45] Date of Patent: Sep. 24, 1996

[54] SCREW SHAFT FEED MECHANISM AND POSITIONING CONTROL METHOD THEREFOR

[75] Inventor: Yoshiharu Seto, La Mirada, Calif.

[73] Assignee: Xilinx, Inc., San Jose, Calif.

[21] Appl. No.: 282,592

[22] Filed: Jul. 29, 1994

[51] Int. Cl.[6] .................................................. G05B 1/06
[52] U.S. Cl. ..................... 318/568.18; 318/571; 318/595; 318/598; 74/428.8 R
[58] Field of Search .................... 318/568.17, 568.18, 318/590–595, 597, 598, 625, 38, 49, 59, 60, 66, 67, 86, 98, 101–103, 571; 74/428.8 R, 428.8 A, 428.8 B

[56] References Cited

U.S. PATENT DOCUMENTS

| | | | |
|---|---|---|---|
| 3,895,279 | 7/1975 | Suzuki et al. | 318/571 |
| 4,897,588 | 1/1990 | Takei | 318/661 |
| 5,119,250 | 6/1992 | Green et al. | 318/561 |
| 5,190,714 | 3/1993 | Reinhart | 264/328.1 |
| 5,315,526 | 5/1994 | Maeda et al. | 318/593 X |
| 5,327,795 | 7/1994 | Katahira | 318/41 X |

*Primary Examiner*—Brian Sircus
*Attorney, Agent, or Firm*—Edel M. Young; Alan H. MacPherson; Norman R. Klivans

[57] ABSTRACT

A screw shaft feed mechanism includes a screw shaft (25) rotatably supported by a frame (19) and extending in a shaft feed direction of a work table (shaft fed base) (1); a nut member (39) rotatably supported by the work table (1) and engaged with the screw shaft (25); a screw shaft drive motor (29) for rotating the screw shaft (25); and a nut drive motor (57) for rotating the nut member (39), wherein both screw shaft driving means and nut driving means are provided with a motor having a device detecting a rotational angle of a motor shaft, respectively. In a positioning control method for a screw shaft feed mechanism, the screw shaft drive motor (29) and the nut drive motor (57) are activated simultaneously; the screw shaft drive motor (29) and the nut drive motor (57) are deactivated in such a way that a time difference is produced between when the screw shaft (25) stops and when the nut member (39) stops; and the work table (1) is located by controlling deceleration of any one of the screw shaft drive motor (39) and the nut drive motor (57) which is stopped later. In this positioning control method, it is possible to locate the work table at high speed and simultaneously at high positioning accuracy.

8 Claims, 6 Drawing Sheets

SCREW SHAFT FEED MECHANISM AND POSITIONING CONTROL METHOD THEREFOR

BACKGROUND OF THE INVENTION

1. Field of the Invention

The present invention relates to a screw shaft feed mechanism and a positioning control method for the screw shaft feed mechanism used for a machine tool, and more specifically to a method of controlling the positioning accuracy of a screw shaft feed mechanism for moving a shaft fed base attached to a work table, for instance at a high speed and at high accuracy.

2. Description of the Related Art

A screw shaft feed mechanism for feeding a shaft fed base of a work table used for a machine tool is disclosed in Japanese Published Unexamined (Kokai) Patent Application No. 5-215195. This mechanism is composed of a feeding screw shaft rotatably attached to a fixed member and extending in a shaft feed direction of a shaft fed base; a nut member rotatably attached to the shaft fed base and engaged with the feeding screw shaft; shaft driving means such as a motor for rotating the feeding screw shaft; and a nut driving means such as a motor mounted on the shaft fed base for rotating the nut member, so that the shaft bed base can be fed at a high speed by activating the screw shaft driving means and the nut driving means simultaneously.

In the above-mentioned screw shaft feed mechanism, however, since the screw shaft driving means and the nut driving means are activated simultaneously, although the feed speed of the shaft bed base can be increased due to the simultaneous activation of both the driving means, there exists a problem in that the positioning accuracy obtained when the shaft fed base is stopped is degraded and therefore not sufficiently high.

In particular, when the shaft fed base is a work table for a turret punch press, for instance and further if the work table cannot be located at a high accuracy, the precision of the products processed by the turret punch press is deteriorated.

SUMMARY OF THE INVENTION

With the problem in mind, therefore, it is the object of the present invention to provide a screw shaft feed mechnism and a positioning control method for the screw shaft feed mechanism, which can realize both high speed feed and accurate location of the shaft feed mechanism.

To achieve the above-mentioned object, according to a first aspect of the present invention, we provide a screw shaft feed mechanism comprising: a feeding screw shaft rotatably supported by a fixed member and extending in a shaft feed direction of a shaft fed base; a nut member rotatably supported by the shaft fed base and engaged with the feeding screw shaft; screw shaft driving means for rotating the feeding screw shaft; and nut driving means for rotating the nut member, the nut driving means mounted on the shaft fed base; wherein both screw shaft driving means and nut driving means provided with a motor having a device detecting a rotational angle of motor shaft, respectively.

According to a second aspect of the present invention, we provide a positioning control method for a screw shaft feed mechanism having a feeding screw shaft rotatably supported by a fixed member and extending in a shaft feed direction of a shaft fed base; a nut member rotatably supported by the shaft fed base and engaged with the feeding screw shaft; screw shaft driving means for rotating the feeding screw shaft; and nut driving means for rotating the nut member, which comprises the steps of: activating the screw shaft driving means and the nut driving means simultaneously; deactivating the screw shaft driving means and the nut driving means in such a way that a time difference is produced between when the feeding screw shaft stops and when the nut member stops; and locating the shaft fed base by controlling deceleration of any one of the screw shaft driving means and the nut driving means which is stopped later.

The time difference between when the feeding screw shaft stops and when the nut member stops is produced by providing a time difference between when the screw shaft driving means is started to be decelerated and when the nut driving means is started to be decelerated. Further, the time difference between when the feeding screw shaft stops and when the nut member stops is produced by providing a difference in deceleration rate between the screw shaft driving means and the nut driving means. Furthermore, the time difference between when the feeding screw shaft stops and when the nut member stops is produced by providing a time difference between when the screw shaft driving means is started to be decelerated and when the nut driving means is started to be decelerated and further by providing a difference in deceleration rate between the screw shaft driving means and the nut driving means.

Further, any one of the screw shaft driving means and the nut driving means which is stopped later is the screw shaft driving means or the nut driving means. Further, it is preferable that the deceleration of any one of the screw shaft driving means and the nut driving means which is stopped later is controlled on the basis of positional feedback signal detected by a linear scale.

In the positioning control method for a screw shaft feed mechanism according to the present invention, since the screw shaft driving means and the nut driving means are both activated simultaneously, it is possible to feed the feed mechanism at higher speed (two times higher than that when either of the screw shaft driving means or the nut driving means is driven).

Further, since a time difference is given between when the feeding screw shaft stops and when the nut member stops and further the shaft fed base is located by controlling the deceleration of one of the screw shaft driving means and the nut driving means, it is possible to obtain a high positioning accuracy equivalent to that obtained when the shaft fed base is located by driving only either one of the screw shaft or the nut member.

Further, when the screw shaft driving means is stopped later, since the shaft fed base can be located by only the screw shaft driving means, it is possible compensate for the shaft feed error caused by the nut member. On the other hand, when the nut driving means is stopped later, since the shaft fed base can be located by only the nut driving means, it is possible compensate for the shaft feed error caused by the feeding screw shaft. In either case, it is possible to obtain a high positioning accuracy. Further, since the load inertial of the nut driving means is usually smaller than that of the screw shaft driving means, when the shaft fed base is positioned by controlling the deceleration of the nut driving means, the positioning error can be reduced effectively and thereby it is possible to locate the feed mechanism more accurately.

BRIEF DESCRIPTION OF THE DRAWINGS

FIG. 1 is a front view showing an essential portion of a screw shaft feed mechanism for feeding a work table of a

Figure 2:
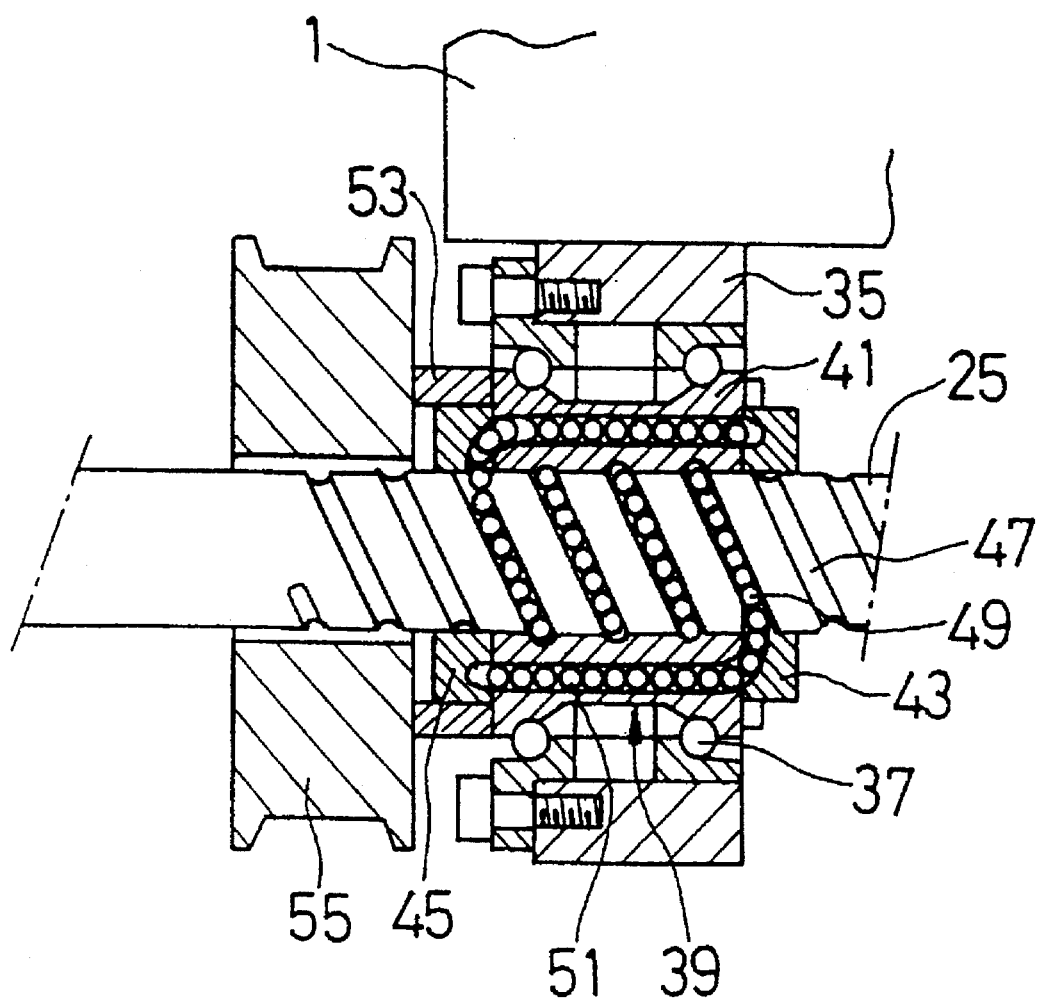
Figure 3:
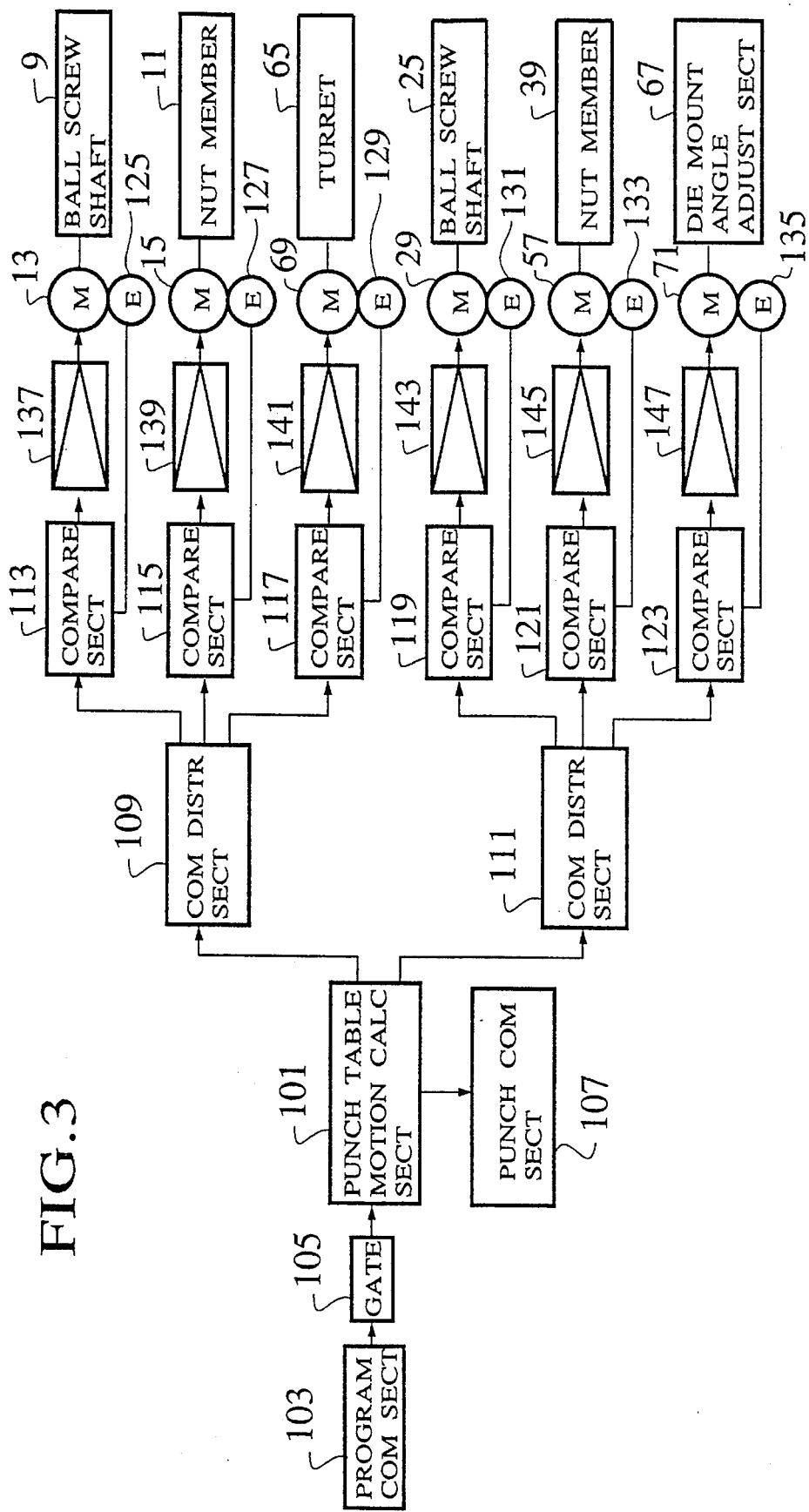
Figure 4A:
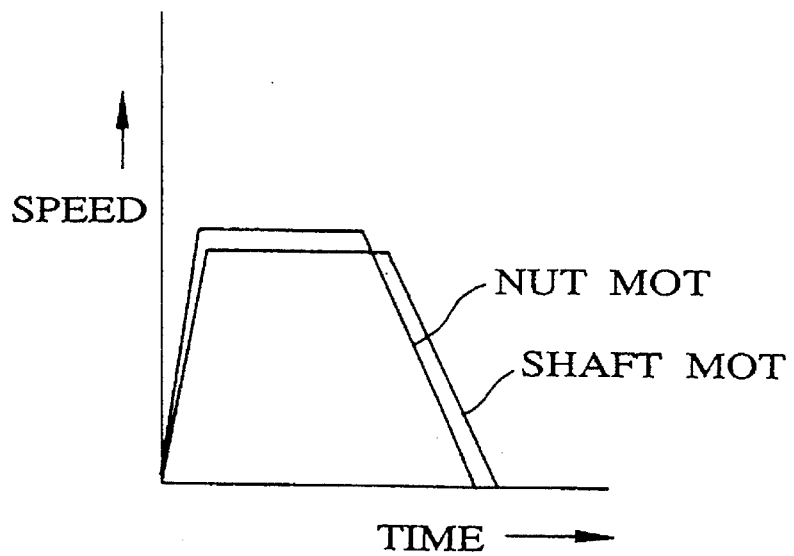
Figure 4B:
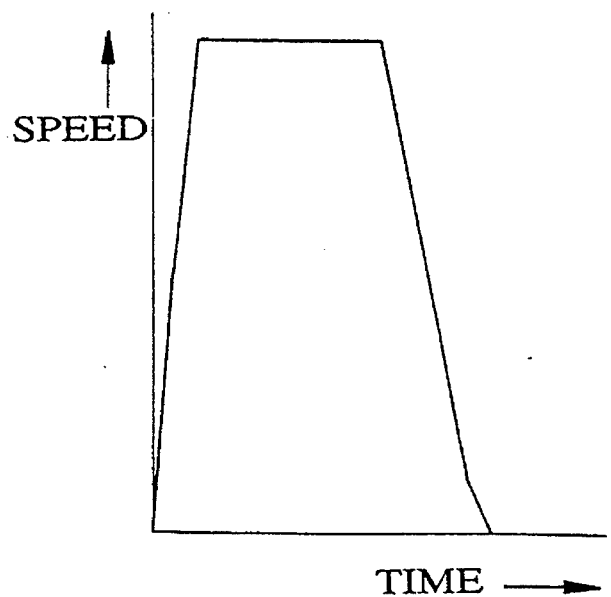
Figure 5:
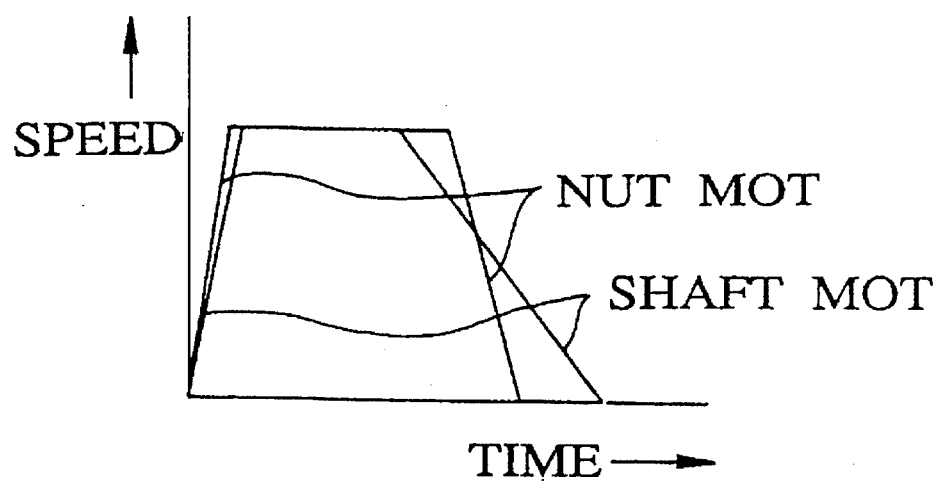
Figure 6:
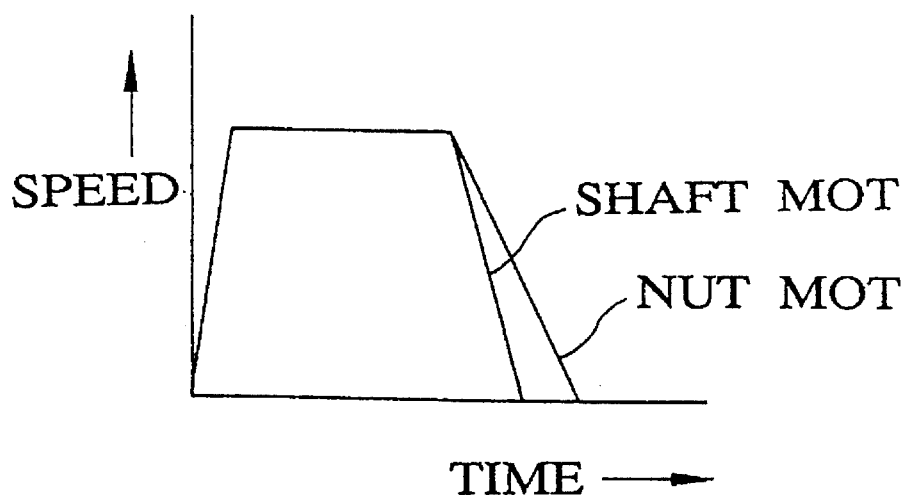
Figure 7:
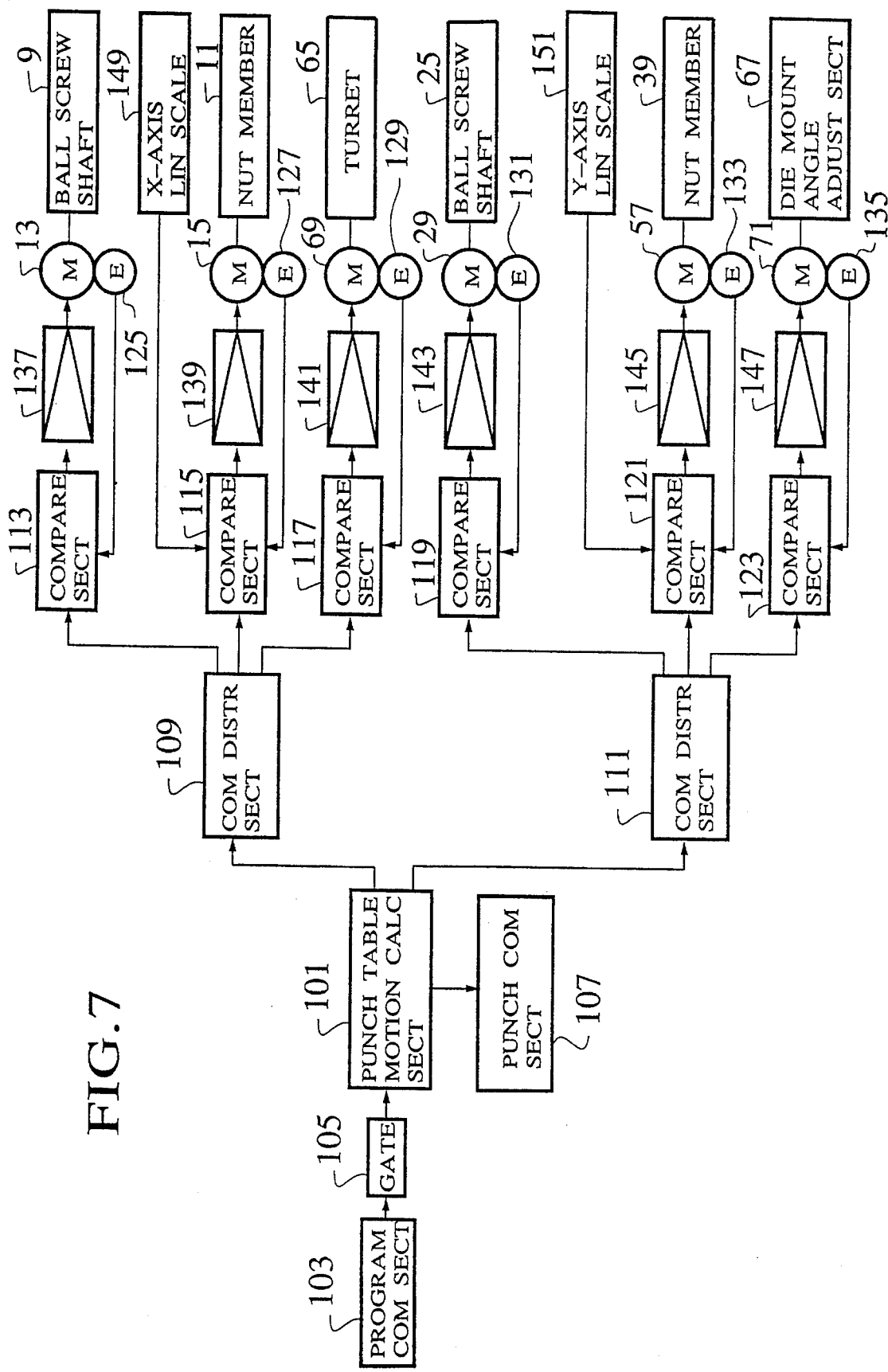

3 turret punch press, according to the present invention is applied by way of example;

FIG. 2 is a detailed cross-sectional view showing a nut member for feeding a work table shaft and its supporting structure;

FIG. 3 is a block diagram showing an embodiment of the control system for realizing the positioning control method according to the present invention;

FIG. 4A is a graphical representation showing an example of two speed characteristics of a screw shaft drive motor and a nut drive motor, respectively;

FIG. 4B is a graphical representation showing an example of the synthesized shaft feed speed characteristics of the screw shaft drive motor and the nut drive motor;

FIG. 5 is a graphical representation showing another example of the two speed characteristics of the screw shaft drive motor and the nut drive motor, respectively;

FIG. 6 is a graphical representation showing still another example of the two speed characteristics of the screw shaft drive motor and the nut drive motor; and FIG. 7 is a block diagram showing another embodiment of the control system for realizing the positioning control method according to the present invention.

DETAILED DESCRIPTION OF THE EMBODIMENTS

The embodiments of the screw shaft feed mechanism and the positioning control method for the screw shaft feed mechanism according to the present invention will be described in detail with reference to the attached drawings.

Figure 1:
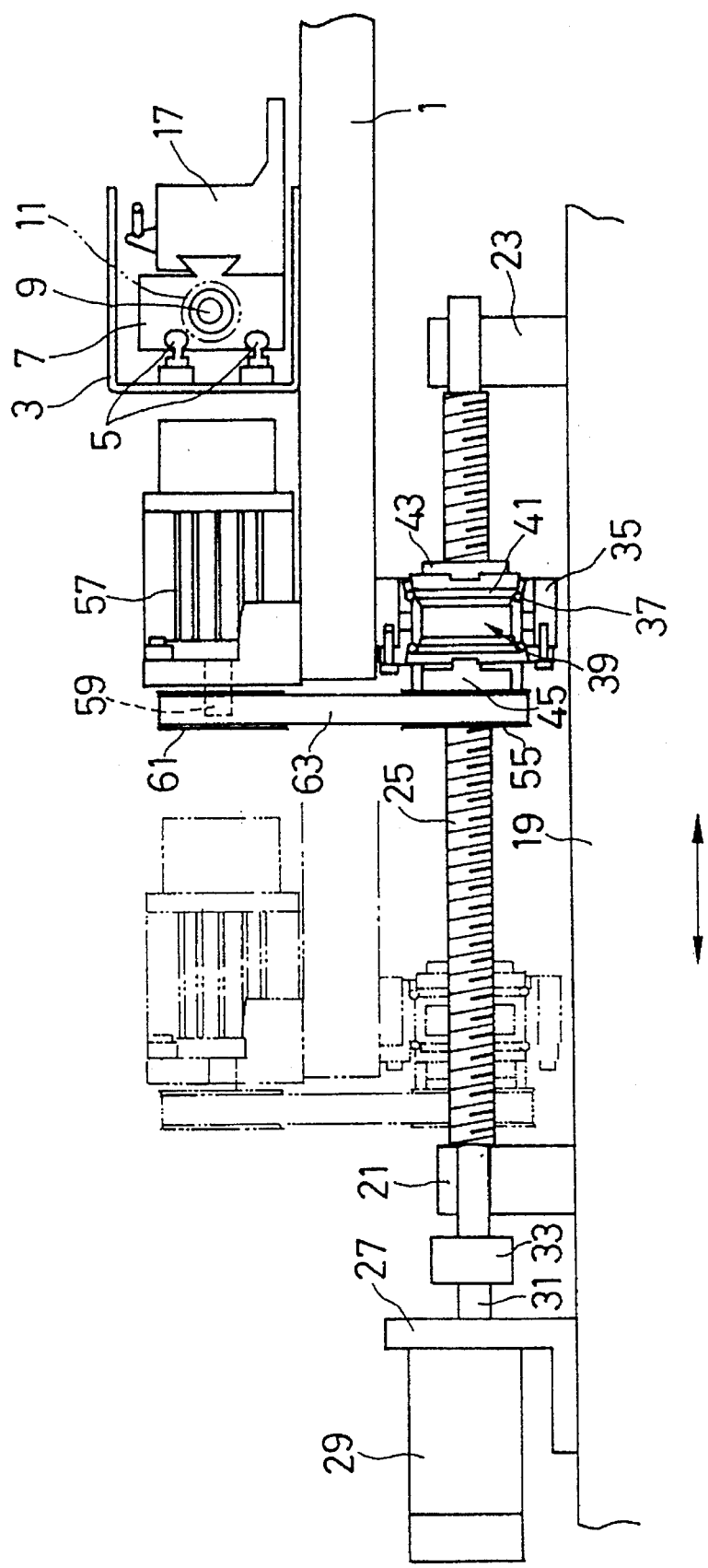

FIG. 1 shows a screw shaft feed mechanism for feeding a work table of a turret punch press, to which the positioning control method according to the present invention is applied by way of example.

In FIG. 1, a work table 1 can be moved in Y-axis direction (the right and left direction in FIG. 1) on the machine coordinate system under guidance by a linear guide mechanism (not shown). In addition, a carriage base 3 is mounted on and fixed to the work table 1 so as to extend in X-axis direction (the direction perpendicular to the paper in FIG. 1). Further, two linear guide rails 5 are fixed to the carriage base 3, and a carriage 7 is engaged with these two linear guide rails 5 so as to be movable in the X-axis direction. A nut member 11 is rotatably attached to the carriage 7. This nut member 11 is engaged with an X-axis feeding ball screw shaft 9 rotatably supported by the carriage base 3. A screw shaft drive motor 13 (not shown in FIG. 1 but shown in FIG. 3) for driving the ball screw shaft 9 is mounted on the carriage base 3.

A work clamp device 17 is attached to the carriage 7 to clamp a plate material (workpiece) arranged on a work table 1.

On the other hand, a fixed frame 19 is provided with three brackets 21, 23 and 27. These two brackets 21 and 23 rotatably support a Y-axis feeding ball screw shaft 25. This feeding ball screw shaft 25 extends in the Y-axis direction, and one end thereof is connected to an output shaft 31 of a screw shaft drive motor 29 (supported by the bracket 27) via a shaft coupling 33.

Another bracket 35 is fixed to the lower bottom surface of the work table 1. This bracket 35 rotatably supports another nut member 39 via a ball bearing 37.

FIG. 2 shows the nut member 39 and its supporting structure in detail. The nut member 39 is formed with a ball

4

(49) circulating path 51, which is formed by a nut body 41 (used in common as an inner race of the ball bearing 37) and two end members 43 and 45 attached to both ends of the nut body 41 in cooperation of a spiral groove 47 formed in the ball screw shaft 25. Further, with reference to FIG. 1, a pulley 55 is fixed to one end of the nut member 39 via a connecting sleeve 53 (see FIG. 2).

On the other hand, a nut drive motor 57 is mounted on the work table 1. A pulley 61 is attached to an output shaft 59 of the nut drive motor 57. An endless belt 63 is reeved between the pulley 61 of the nut drive motor 57 and the pulley 55 of the nut member 39.

FIG. 3 shows a first embodiment of a control system for realizing the positioning control method according to the present invention.

The control system is an CNC system including a punching table motion calculating section 101. This punching table motion calculation section 101 executes various processing in accordance with processing programs inputted from a program command section 103 through a gate 105.

Further, the punching table motion calculation section 101 outputs a striker drive command to a punching command section 107; a feeding screw shaft drive command and a nut drive command for position control in the X-axis direction and a turret drive command for index-rotation control of a turret disk 65, through a command distribute section 109; and a feeding screw shaft drive command and a nut drive command for position control in the Y-axis direction and a die index command for controlling a die mounting angle by a die mounting angle adjusting device 67 mounted on the turret disk 65, through another command distribute section 111.

The command distribute section 109 outputs the screw shaft drive command for the position control of the carriage 7 in the X-axis direction to a compare section 113, the nut drive command for the position control of the carriage 7 in the X-axis direction to another compare section 115, and the turret drive command For index control of the turret disk 65 to another compare section 117, respectively.

The command distribute section 111 outputs the screw shaft drive command for the position control of the work table 1 in the Y-axis direction to another compare section 119, the nut drive command for the position control of the work table 1 in the Y-axis direction to another compare section 121, and the die index command for die mounting angle control of the die mounting angle adjusting device 67 to the other compare section 123, respectively.

The compare section 113 inputs motor rotational angle signals from an encoder 125 connected to an X-axis feed crew shaft drive motor 13, calculates a difference between the command angle value inputted from the command distribute section 109 and the actual motor rotational angle value, and outputs a motor drive command obtained based upon the calculated difference to the X-axis feed screw shaft drive motor 13 connected to the ball screw shaft 9 via an amplifier 137.

The compare section 115 inputs motor rotational angle signals from an encoder 127 connected to a nut drive motor 15, calculates a difference between the command angle value inputted from the command distribute section 109 and the actual motor rotational angle value, and outputs a motor drive command obtained based upon the calculated difference to the nut drive motor 15 connected to the nut member 11 via an amplifier 139.

The compare section 117 inputs motor rotational angle signals from an encoder 129 connected to a turret drive motor 69, calculates a difference between the command angle value inputted from the command distribute section 109 and the actual motor rotational angle value, and outputs a motor drive command obtained based upon the calculated difference to the turret drive motor 69 connected to the turret 65 via an amplifier 141.

On the other hand, the compare section 119 inputs motor rotational angle signals from an encoder 131 connected to a Y-axis feed crew shaft drive motor 29, calculates a difference between the command angle value inputted from the command distribute section 111 and the actual motor rotational angle value, and outputs a motor drive command obtained based upon the calculated difference to the Y-axis feed screw shaft drive motor 29 connected to the ball screw shaft 25 via an amplifier 143.

The compare section 121 inputs motor rotational angle signals from an encoder 133 connected to a nut drive motor 57, calculates a difference between the command angle value inputted from the command distribute section 111 and the actual motor rotational angle, and outputs a motor drive command obtained based upon the calculated difference to the nut drive motor 57 connected to the nut member 39 via an amplifier 145.

The compare section 123 inputs motor rotational angle signals from an encoder 135 connected to a die drive motor 71, calculates a difference between the command angle value inputted from the command distribute section 111 and the actual motor rotational angle value, and outputs a motor drive command obtained based upon the calculated difference to the die drive motor 71 connected to the die mounting angle adjusting device 67 via an amplifier 147.

Therefore, the respective motors are all driven in accordance with the processing programs executed by the punching table motion calculating section 101. In addition, encoders 125, 127, 129, 131, 133, 135 are to detect rotational angles of motor shafts of the motors 13, 15, 69, 29, 57 and 71, respectivey.

In the positioning control method according to the present invention, the screw shaft drive motor 13 and the nut drive motor 15 are driven simultaneously to move the carriage 7 in the X-axis direction. Further, the screw shaft drive motor 29 and the nut drive motor 57 are driven simultaneously to move the work table 1 in the Y-axis direction. As a result, the carriage 7 and the work table 1 can be both moved at a speed which is two times higher than that of the conventional speed (in comparison with the case where the carriage or the work table is fed by driving only either of the screw shaft drive motor or the nut drive motor). Further, at the start of the screw shaft drive motors 13 and 29 or the nut drive motors 15 and 57, these motors are driven at their maximum accelerations obtained by the motor control systems, respectively.

Further, in the positioning control method according to the present invention, the screw shaft drive motors 13 and 29 and the nut drive motors 15 and 57 are stopped in such a way that there exists a time difference between when the ball screw shaft 9 or 25 is stopped and when the nut member 11 or 39 is stopped. This is because the carriage 7 can be located by controlling the deceleration of the screw shaft drive motor 13 or the nut drive motor 15 which is stopped later. On the other hand, the work table 1 can be located by controlling the deceleration of the screw shaft drive motor 29 or the nut drive motor 57 which is stopped later.

In this connection, in comparison between the screw shaft drive motor 13 or 29 and the nut drive motor 15 or 57, the load of the nut drive motor 15 or 57 is usually smaller that of the screw shaft drive motor 13 or 29. Therefore, even if the screw shaft drive motor 13 or 29 is driven so as to output the same rotational power as that of the nut drive motor 15 or 57 (i.e., the number of distributed drive command pulses is the same in both) and further both the screw shaft drive motor 13 or 29 and the nut drive motor 15 or 57 are driven or stopped simultaneously, the nut drive motor 15 or 57 reaches a target speed earlier and stops earlier than the screw shaft drive motor 13 or 29. In other words, the nut drive motor 15 or 57 can be accelerated and decelerated at high rate as compared with the screw shaft drive motor 13 or 29. Accordingly, it is understood that the final position of the carriage 7 or the work table 1 is usually determined by the screw shaft drive motor 13 or 29 (because this motor is stopped later), respectively, and the positioning accuracy thereof is usually decided on the basis of only the deceleration characteristics of the screw shaft drive motor 13 or 29, respectively.

In the positioning control method according to the present invention, however, a time difference between when the screw shaft stops and when the nut member stops is produced by providing a time difference between when the screw shaft drive motor is started to be decelerated and when the nut drive motor is started to be decelerated and/or by providing a difference in deceleration rate between the screw shaft drive motor and the nut drive motor.

Therefore, even if the screw shaft drive motor and the nut drive motor are driven simultaneously, since the carriage 7 and or work table 1 can be both located by controlling only either of the screw shaft drive motor 13 or 29 or the nut drive motor 15 or 57 (which is stopped later), it is possible to obtain the same positioning accuracy as that obtained when the carriage 7 or the work table 1 is driven by only the screw shaft drive motor 13 or 29 or the nut drive motor 15 or 57, respectively.

FIG. 4A shows speed characteristics of a screw shaft drive motor 13 or 29 and a nut drive motor 15 or 57, independently; and FIG. 4B shows the synthesized shaft feed speed characteristics of both the screw shaft drive motor 13 or 29 and the nut drive motor 15 or 57. In FIG. 4A, the screw shaft drive motor 13 or 29 and the nut drive motor 15 or 57 are both activated simultaneously, but the nut drive motor is deactivated earlier that the screw shaft drive motor. In other words, the deceleration start time of the nut drive motor 15 or 57 is determined earlier than that of the screw shaft drive motor 13 or 29, and the deceleration rate of both is determined to be roughly equal to each other.

Therefore, the carriage 7 and the work table 1 can be located on the basis of the stop motion (deceleration) of the screw shaft drive motors 13 and 29, respectively.

On the other hand, in another example shown in FIG. 5, the deceleration start time of the screw shaft drive motor 13 or 29 is determined to be earlier than that of the nut drive motor 15 or 57, and further the deceleration rate of the shaft drive motor 13 or 29 is determined lower than that of the nut drive motor 15 or 57. Therefore, the carriage 7 and the work table 1 can be located on the basis of the stop motion (deceleration) of the screw shaft drive motors 13 and 29, respectively.

Further, in the other example shown in FIG. 6, the deceleration start time of the screw shaft drive motor 13 or 29 is determined to be equal to that of the nut drive motor 15 or 57, and further the deceleration rate of the screw shaft drive motor 13 or 29 is determined higher than that of the nut drive motor 15 or 57. Therefore, the carriage 7 and the work table 1 can be located on the basis of the stop motion (deceleration) of the nut drive motors 15 and 57, respectively.

As already explained, since the load or the inertial of the nut drive motor 15 or 57 is usually smaller than that of the screw shaft drive motor 13 or 29, when the carriage 7 or the work table 1 is stopped by controlling the nut drive motor 15 or 57, it is possible to locate the carriage 7 or the work table 1 at high positioning accuracy.

FIG. 7 shows another embodiment of the positioning control system according to the present invention, in which an X-axis linear scale 149 and a Y-axis linear scale 151 are additionally incorporated in the control system shown in FIG. 3. Therefore, the same reference numerals have been retained for the similar sections which have the same functions as with the case of the system shown in FIG. 3.

In more detail, the X-axis linear scale 149 detects the position of the carriage 7 in the X-axis feed direction, and outputs a positional feedback signal to the compare section 113 or 115 corresponding to the motor 13 or 15 which is stopped later. On the other hand, the Y-axis linear scale 151 detects the position of the work table 1 in the Y-axis feed direction, and outputs a positional feedback signal to the compare section 119 or 121 corresponding to the motor 29 or 57 which is stopped later.

In the case of the speed characteristics as shown in FIG. 6 for instance, since the nut drive motors 15 and 57 are stopped later after the screw shaft drive motors 13 and 29 have been stopped, the positional feedback signals are outputted from both the linear scales 149 and 151 to the nut drive motors 15 and 57, respectively as shown in FIG. 7.

In the above-mentioned embodiment shown in FIG. 7, since the positioning of the carriage 7 and the work table 1 can be controlled by the nut drive motors 15 and 57 of less load or less inertia on the basis of the feedback signal under closed loop control system, it is possible to locate the carriage 7 and the work table 1 at further high positioning accuracy.

Further, in the above-mentioned embodiments, although the positioning control method according to the present invention has been explained only when applied to the work table and the carriage of the turret punch press, the positioning control method of the present invention can be of course applied to a machine tool such as a machining center, in which various elements to be moved or shifted in various directions must be controllably positioned or located at high accuracy.

As described above, in the positioning control method for a screw shaft feed mechanism according to the present invention, since the screw shaft drive motor and the nut drive motor are both activated simultaneously, it is possible to position the feed mechanism at higher speed (twice higher than that when either of the screw shaft drive motor or the nut drive motor is driven). Further, since a time difference is provided between when the screw shaft is stopped and when the nut member is stopped and thereby the shaft fed base can be located under deceleration control of motor for driving the shaft or the nut which is stopped later, it is possible to obtain a high positioning accuracy equivalent to when the shaft fed base such as the work table or the carriage is located by driving only either one of the screw shaft or the nut member.

Further, when the screw shaft drive motor is stopped later, since the shaft Fed base can be located by controlling only the screw shaft drive motor, it is possible compensate for the shaft feed error caused by the nut drive. On the other hand, when the nut drive motor is stopped later, since the shaft fed base can be located by controlling only the nut drive motor, it is possible compensate For the shaft feed error caused by the screw shaft drive. In either case, it is possible to obtain a high positioning accuracy, respectively. However, since the load or the inertia of the nut drive motor is usually smaller than that of the screw shaft drive motor, when the shaft fed base is positioned by the nut drive motor, the positioning error can be reduced small and thereby it is possible to locate the feed mechanism more accurately.

What is claimed is:

1. A screw shaft feed mechanism comprising:

a feeding screw shaft rotatably supported by a fixed member and extending in a shaft feed direction of a shaft fed base;

a nut member rotatably supported by the shaft fed base and engaged with the feeding screw shaft; wherein the feeding screw shaft and the nut member are driven simultaneously;

screw shaft driving means for rotating the feeding screw shaft; and nut driving means for rotating the nut member, the nut driving means mounted on the shaft fed base;

wherein both screw shaft driving means and nut driving means are each provided with a motor having a device detecting a rotational angle of a motor shaft; and a controller for controlling deceleration of both of the screw shaft driving means and the nut driving means.

2. A positioning control method for a screw shaft feed mechanism having a feeding screw shaft rotatably supported by a fixed member and extending in a shaft feed direction of a shaft fed base; a nut member rotatably supported by the shaft fed base and engaged with the feeding screw shaft; and nut driving means for rotating the nut member, which comprises the steps of:

activating the screw shaft driving means and the nut driving means simultaneously such that the feeding screw shaft and the nut member are each linearly translated relative to each other simultaneously;

deactivating the screw shaft driving means to cause the feeding screw shaft to decelerate and the nut driving means to cause the nut to decelerate in such a way that a time difference is produced between when the feeding screw shaft stops and when the nut member stops; and locating the shaft fed base by controlling deceleration of any one of the screw shaft driving means and the nut driving means which is stopped later.

3. The positioning control method for a screw shaft feed mechanism of claim 2, wherein the time difference between when the feeding screw shaft stops and when the nut member stops is produced by providing a time difference between when the screw shaft driving means is started to be decelerated and when the nut driving means is started to be decelerated.

4. The positioning control method for a screw shaft feed mechanism of claim 2, wherein the time difference between when the feeding screw shaft stops and when the nut member stops is produced by providing a difference in deceleration rate between the screw shaft driving means and the nut driving means.

5. The positioning control method for a screw shaft feed mechanism of claim 2, wherein the time difference between when the feeding screw shaft stops and when the nut member stops is produced by providing a time difference between when the screw shaft driving means is started to be decelerated and when the nut driving means is started to be decelerated and further by providing a difference in deceleration rate between the screw shaft driving means and the nut driving means.

6. The positioning control method of claim 2, wherein the screw shaft driving means is stopped later.

7. The positioning control method of claim 2, wherein the nut driving means is stopped later.

8. The positioning control method of claim 2, wherein the deceleration of any one of the screw shaft driving means and the nut driving means which is stopped later is controlled on the basis of a positional feedback signal detected by a linear scale.

* * * * *

UNITED STATES PATENT AND TRADEMARK OFFICE
CERTIFICATE OF CORRECTION

PATENT NO. : 5,559,413
DATED : September 24, 1996
INVENTOR(S) : Yoshiharu Seto

It is certified that error appears in the above-indentified patent and that said Letters Patent is hereby corrected as shown below:

IN THE TITLE PAGE:

Please correct the name of the Assignee as follows:

[73] Assignee: Amada Mfg America Inc., La Mirada, Calif.

Please add the following reference under "References Cited":

[56] FOREIGN PATENT DOCUMENTS

5-215195   8/1993   Japan

Please correct the Attorney, Agent or Firm to read as follows:

--Wigman, Cohen, Leitner & Myers, P.C.--

Signed and Sealed this

Eleventh Day of November, 1997

*Attest:*

BRUCE LEHMAN

*Attesting Officer*  *Commissioner of Patents and Trademarks*